US010762920B2

(12) United States Patent
Sakamoto et al.

(10) Patent No.: US 10,762,920 B2
(45) Date of Patent: Sep. 1, 2020

(54) MAGNETIC DISK DEVICE

(71) Applicants:Kabushiki Kaisha Toshiba, Minato-ku, Tokyo (JP); Toshiba Electronic Devices & Storage Corporation, Minato-ku, Tokyo (JP)

(72) Inventors: Nobuyuki Sakamoto, Yokohama Kanagawa (JP); Isamu Tomita, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/353,382

(22) Filed: Mar. 14, 2019

(65) Prior Publication Data
US 2020/0082846 A1    Mar. 12, 2020

(30) Foreign Application Priority Data

Sep. 11, 2018  (JP) ................................. 2018-169817

(51) Int. Cl.
| | |
|---|---|
| *G11B 27/36* | (2006.01) |
| *G11B 5/48* | (2006.01) |
| *G11B 19/20* | (2006.01) |
| *G11B 5/58* | (2006.01) |
| *G06F 1/26* | (2006.01) |
| *G11B 5/54* | (2006.01) |
| *H02K 41/035* | (2006.01) |

(52) U.S. Cl.
CPC ............ *G11B 5/4806* (2013.01); *G06F 1/266* (2013.01); *G11B 5/54* (2013.01); *G11B 5/58* (2013.01); *G11B 19/209* (2013.01); *H02K 41/0354* (2013.01); *G11B 2220/2516* (2013.01)

(58) Field of Classification Search
CPC ... G11B 5/5578; G11B 5/5547; G11B 5/5552; G11B 5/5565; G11B 5/5582; G11B 5/4813; G11B 17/044; G11B 5/53; G11B 27/36
USPC ....... 360/75, 78.06, 55, 77.04, 78.05, 78.09, 360/78.12, 99.02, 272, 264.4
See application file for complete search history.

(56) References Cited

U.S. PATENT DOCUMENTS

| | | | | |
|---|---|---|---|---|
| 5,223,993 A | * | 6/1993 | Squires | ................. G06F 3/0601 360/246.7 |
| 5,610,808 A | * | 3/1997 | Squires | ................. G06F 3/0601 700/2 |
| 6,208,489 B1 | * | 3/2001 | Marchon | .............. G11B 5/6005 360/254 |
| 6,625,690 B2 | | 9/2003 | Kamo et al. | |

(Continued)

FOREIGN PATENT DOCUMENTS

JP    H07-093869 A    4/1995

*Primary Examiner* — Nabil Z Hindi
(74) *Attorney, Agent, or Firm* — White & Case LLP

(57) ABSTRACT

According to one embodiment, a magnetic disk device includes a first magnetic disk, a second magnetic disk, a first actuator with a first head which reads/writes data from/to the first magnetic disk, a second actuator with a second head which reads/writes data from/to the second magnetic disk, the second actuator operated independently from the first actuator, a first controller configured to retracts the first actuator at a first time, and a second controller configured to retract the second actuator at a second time which is shifted from the first time by a certain period of time.

10 Claims, 5 Drawing Sheets

(56) References Cited

U.S. PATENT DOCUMENTS

| | | | | |
|---|---|---|---|---|
| 6,819,513 B2* | 11/2004 | Chainer | ............... | G11B 5/4976 |
| | | | | 360/61 |
| 6,839,307 B2* | 1/2005 | Ikai | ........................ | G11B 7/121 |
| | | | | 369/44.14 |
| 7,706,097 B2* | 4/2010 | Kuroki | ..................... | G11B 5/54 |
| | | | | 360/75 |
| 9,064,537 B1* | 6/2015 | Nie | .................... | G11B 5/59627 |
| 9,911,442 B1* | 3/2018 | Kharisov | ............. | G11B 5/5547 |

* cited by examiner

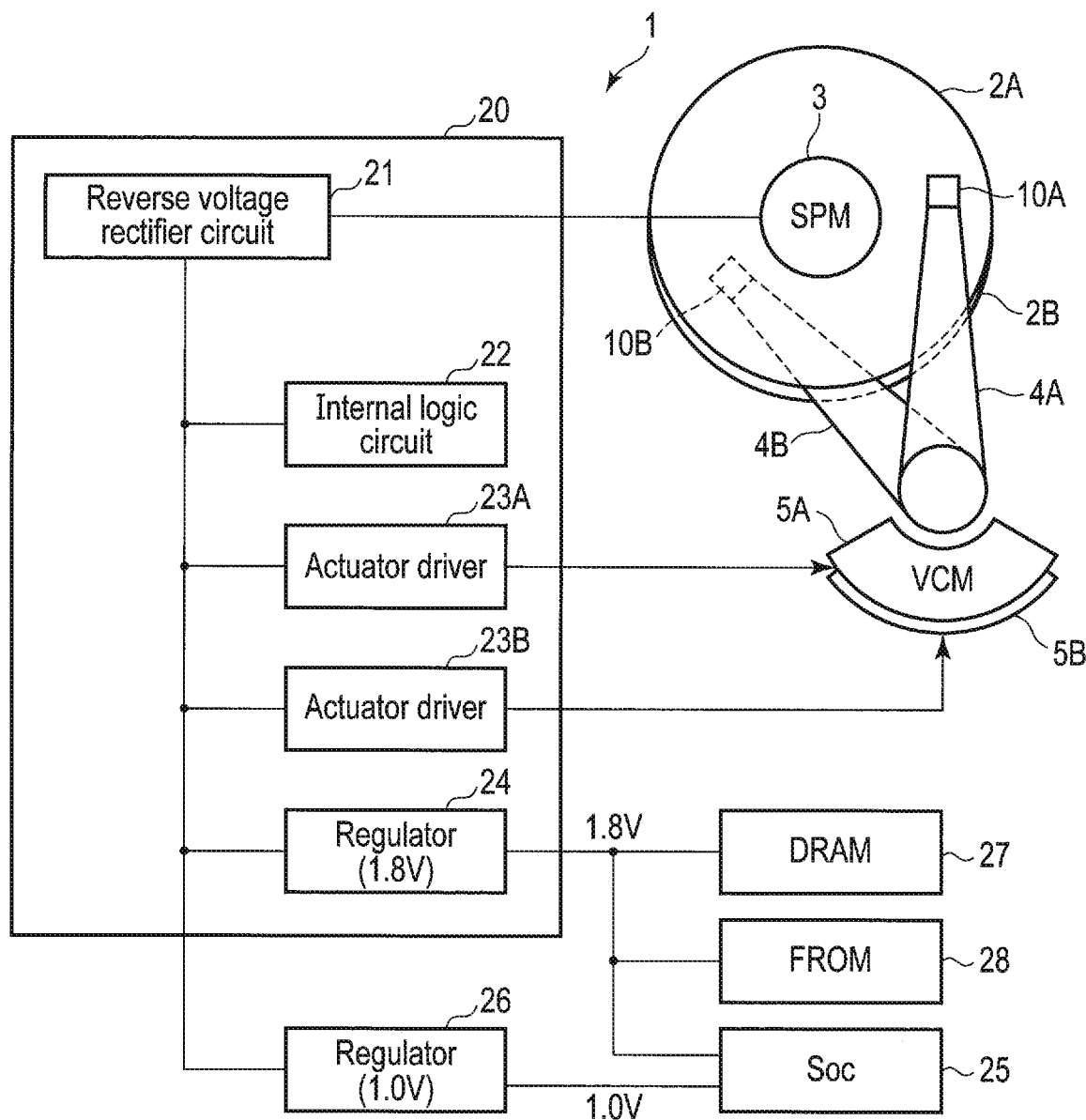
F I G. 1

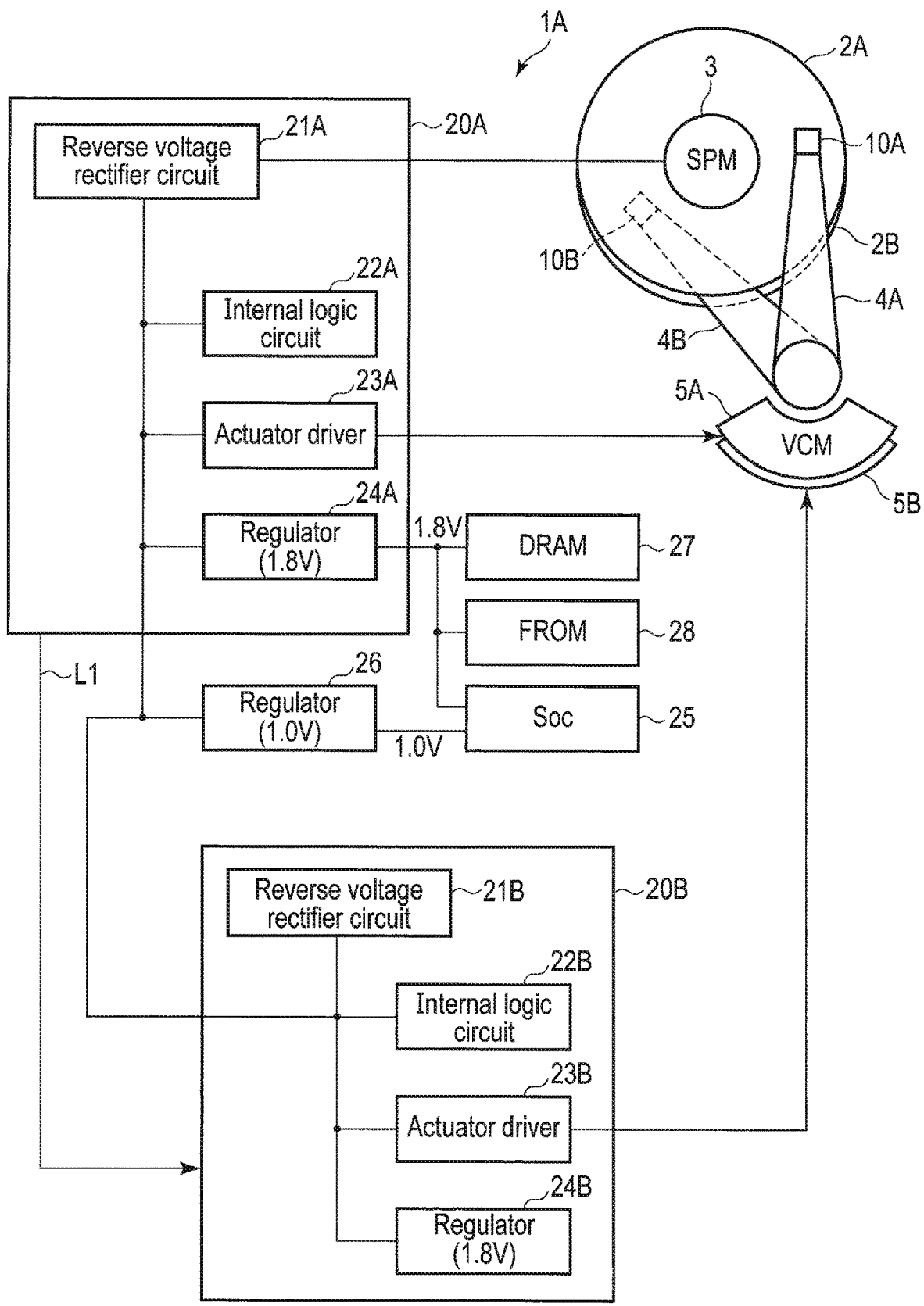
F I G. 7

MAGNETIC DISK DEVICE

CROSS-REFERENCE TO RELATED APPLICATIONS

This application is based upon and claims the benefit of priority from Japanese Patent Application No. 2018-169817, filed Sep. 11, 2018, the entire contents of which are incorporated herein by reference.

FIELD

Embodiments described herein relate generally to a magnetic disk device.

BACKGROUND

Magnetic disk devices with a plurality of independently-driven actuators, for example, with two actuators (dual actuators) are proposed. In such a magnetic disk device, two actuators are vertically and coaxially separated such that the actuators can separately read/write data from/to a magnetic disk. With such a structure, the random access performance of the magnetic disk device to magnetic disks can be improved.

In some cases, magnetic disk devices are suddenly shut down. In that case, in order to protect the magnetic disks, heads must be retracted from the magnetic disk. For example, if the power is cut, a back electromotive force of a spindle motor which operates an actuator with the head is used to supply power to a controller configured to control the actuator and the actuator is retracted. Furthermore, the back electromotive force of the spindle motor is used as the power of internal logic circuit or the like of a motor driver.

Now, a relationship between a retract power and a back electromotive force in a magnetic disk device including one actuator (single actuator) will be explained. If the power is cut, brake current is supplied to stop the operation of the single actuator. The back electromotive force decreases in proportion to the current because of a coil resistance of a spindle motor. Then, after the actuator with the head is moved to an outer periphery part of the magnetic disk at a constant speed, a great force is generated in a ramp direction because of a magnet latch. Current to perform the retraction is supplied to cancel the force; however, the current to perform the retraction is limited since the internal logic circuit and the like of a motor driver do not properly work when the back electromotive force becomes too low.

In contrast, in the magnetic disk device of dual actuator, current to perform the retraction must be doubled as compared to the magnetic disk device of single actuator. Thus, if the power is cut and the dual actuators are retracted but the back electromotive force is significantly decreased and the current to perform the retraction is limited, sufficient current to perform the retraction of two actuators may not be obtained. When the current to perform the retraction is insufficient, the actuators each collide an outer stop at a fast speed and contaminants may be produced which may decrease the reliability of the magnetic disk device.

The present application presents safety retraction control of a plurality of actuators driving independently and a magnetic disk device adopting the same control to improve the reliability.

BRIEF DESCRIPTION OF THE DRAWINGS

FIG. 1 shows a schematic example of the structure of a magnetic disk device of a first embodiment.

FIG. 7 shows a schematic example of the structure of a magnetic disk device of a second embodiment.

DETAILED DESCRIPTION

Figure 2:
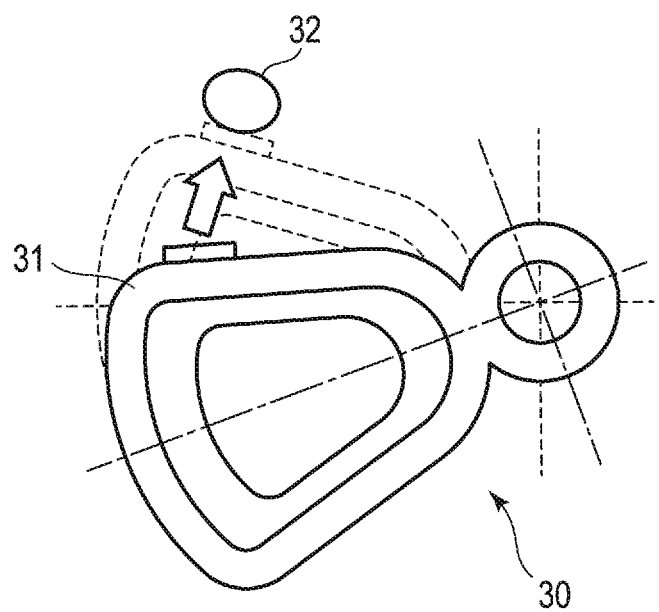
FIG. 2 shows a mechanism of a magnet latch mechanism of the first embodiment.

In general, according to one embodiment, a magnetic disk device includes a first magnetic disk, a second magnetic disk, a first actuator, a second actuator, a first controller and a second controller. The first actuator with a first head which reads/writes data from/to the first magnetic disk. The second actuator with a second head which reads/writes data from/to the second magnetic disk, the second actuator operated independently from the first actuator. The first controller configured to retracts the first actuator at a first time. The second controller configured to retracts the second actuator at a second time which is shifted from the first time by a certain period of time.

Hereinafter, embodiments will be described with reference to the accompanying drawings. Note that the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

First Embodiment

FIG. 1 shows a schematic example of the structure of a magnetic disk device 1.

As shown in FIG. 1, the magnetic disk device 1 is, for example, a hard disk drive (HDD), and includes magnetic disks (disks) 2A and 2B, spindle motor (SPM) 3, actuators 4A and 4B, voice coil motors (VCM) 5A and 5B, magnetic heads (heads) 10A and 10B, driver IC 20, system-on-chip (Soc) 25, regulator 26, DRAM 27, and flash ROM (FROM) 28. Furthermore, the magnetic disk device 1 is connectable with a host which is not shown. The heads 10A and 10B each include a write head (recording head, or writer) and a read head (resuming head, or reader). Note that the disks 2A and 2B, actuators 4A and 4B, and Soc 25 correspond to a first disk, second disk, first actuator, second actuator, and third controller of the claims, respectively.

The disks 2A and 2B each include, for example, a disk-like nonmagnetic substrate. On each surface of the substrates, a soft magnetic layer formed of a soft magnetic material as an underlying layer, magnetic recording layer exerting magnetic anisotropy in the vertical direction with respect to the disk surface, and protection film layer are layered in this order.

The disks 2A and 2B are fixed to the spindle motor (SPM) 3 and are rotated by the SPM 3 at a certain rate. Note that, in the present embodiment, two disks 2A and 2B are disposed in the SPM 3 to correspond to the actuators 4A and 4B (in other words, heads 10A and 10B). The SPM 3 is driven by driving current (driving voltage) supplied from the driver IC 20. Data are recorded/resumed to/from the disks 2A and 2B by the heads 10A and 10B. Note that the number of disks may be three or more, and in that case, the number of actuators may be increased to correspond to the number of disks.

The actuators 4A and 4B are rotatably disposed and the heads 10A and 10B are supported by the tips thereof. The actuators 4A and 4B are rotated by the voice coil motor VCM 5A and 5B, and the heads 10A and 10B are each moved over a desired track of the disks 2A and 2B and positioned. The VCMs 5A and 5B are each driven by drive current (drive voltage) supplied by the driver IC 20. As described above, the magnetic disk device 1 includes a dual actuator system in which the actuators 4A and 4B are independently driven.

The driver IC 20 controls the drive of the SPM 3 and VCMs 5A and 5B under the control of the Soc 25. When the VCMs 5A and 5B are driven, the actuators 4A and 4B are operated, and the heads 10A and 10B are positioned over target tracks on the disks 2A and 2B. Furthermore, when the power supplied to the magnetic disk device 1 is cut, the driver IC 20 drives the VCMs 5A and 5B and retracts the actuators 4A and 4B.

The driver IC 20 includes a back electromotive force rectifier circuit 21, internal logic circuit 22, actuator driver 23A, actuator driver 23B, and regulator 24. The back electromotive force rectifier circuit 21 is a circuit to rectify the back electromotive force generated by the rotation of the SPM 3 when the power to the magnetic disk device 1 is cut. The rectified current is supplied to the internal logic circuit 22, actuator driver 23A, actuator driver 23B, and regulator 24.

The internal logic circuit 22 includes a logic circuit and the like used to drive of the SPM 3 and VCMs 5A and 5B by the driver IC 20. When the back electromotive force of the SPM 3 generated in the case of power cut to the magnetic disk device 1 becomes too low, a normal operation may become impossible. Thus, the internal logic circuit 22 performs a process of limiting the current supplied to the actuator drivers 23A and 23B (retract current).

The actuator drivers 23A and 23B drive the VCMs 5A and 5B, respectively. When the power to the magnetic disk device 1 is cut, the actuator drivers 23A and 23B are operated on the basis of the retract current from the back electromotive force rectifier circuit 21, and the ACMs 5A and 5B are each driven to perform the retraction of the actuators 4A and 4B. The retraction process will be explained with reference to FIG. 3. Note that the actuator drivers 23A and 23B correspond to a first controller and a second controller of the claims, respectively.

When the power is cut described as above, the regulator 24 uses current from the back electromotive force rectifier circuit 21 to stably output a voltage of 1.8 V. The regulator 24 supplies the 1.8 V voltage to each of the DRAM 27, FROM 28, and Soc 25.

In the Soc 25, a read/write (R/W) channel, hard disk controller (HDC), and microprocessor unit (MPU) are included. The Soc 25 performs a read/write process of data with respect to the disks 2A and 2B via a head amp IC (which is not shown) and the heads 10A and 10B.

The regulator 26 is externally attached to the driver IC 20 and stably outputs a voltage of 1.0 V. Furthermore, the regulator 26 supplies the 1.0 V voltage to the Soc 25.

The DRAM 27 is a volatile memory. The DRAM 27 maintains various data while the power is supplied from the regulator 24. The DRAM 27, however, cannot maintain the various data when the power supply from the regulator 24 is cut. Here, the various data are data related to read/write of the data. Note that, in the present embodiment, the DRAM is used as a volatile memory; however, this is merely an example, and another volatile memory may be used.

The FROM 28 is a nonvolatile memory. When the power is supplied to the FROM 28, the Soc 25 can read/write data from/to the memory. Furthermore, the FROM 28 can maintain various data even if the power supply to the regulator 24 is cut. Note that, in the present embodiment, the FROM 28 is used as a nonvolatile memory; however, this is merely an example, and another nonvolatile memory may be used.

Now, a magnet latch will be explained. FIG. 2 shows a mechanism of a magnet latch mechanism 30. The magnet latch mechanism 30 is a mechanism to prevent detachment of a carriage from a ramp caused by the rotation of the carriage with a traction force of a magnet. In the present embodiment, as shown in FIG. 2, the magnet latch mechanism 30 includes a metal piece 31 disposed in a part of the VCM coil and a latch-suction micro magnet as a fixation side. For example, when the actuators 4A and 4B are retracted and the actuators 4A and 4B are moved to the outer periphery parts of the disks 2A and 2B, the carriage is fixed by the traction force of the magnet.

Figure 3:
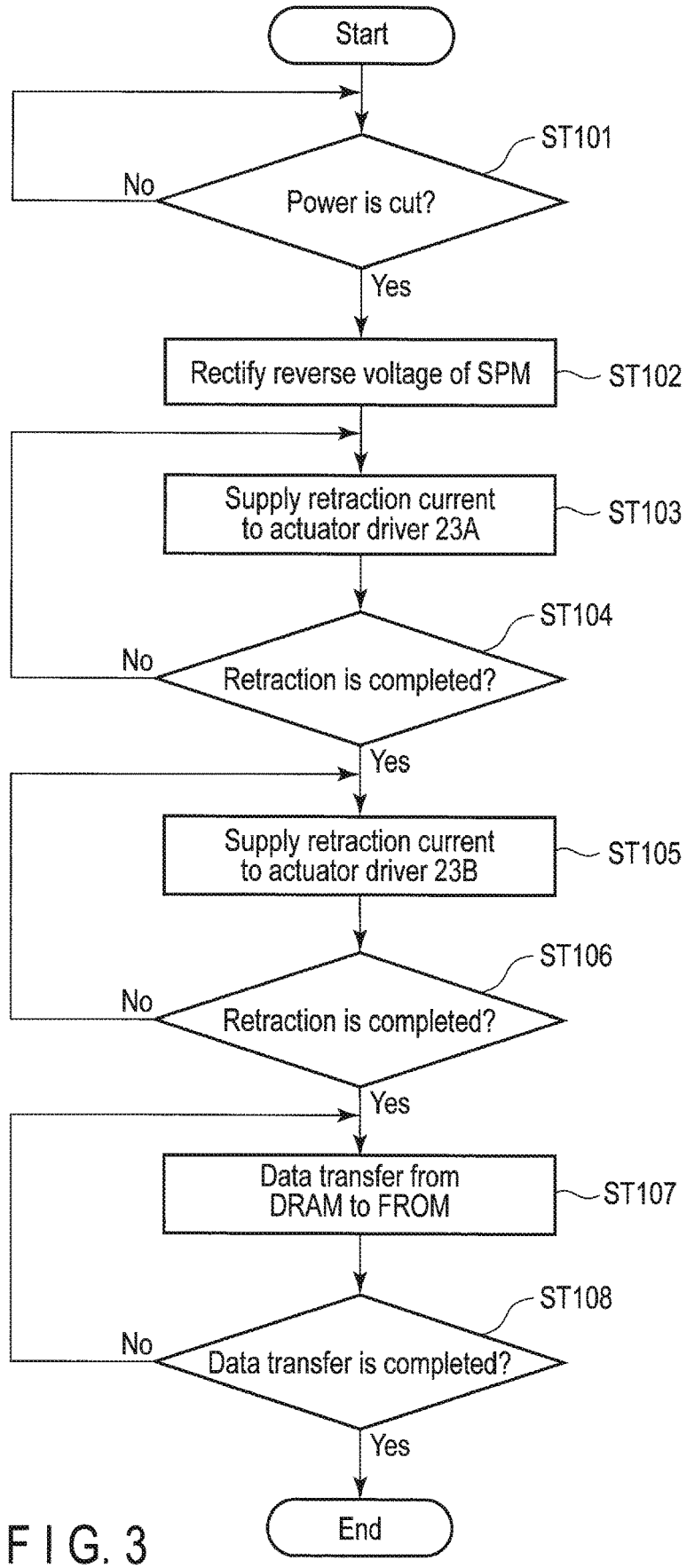
FIG. 3 is a flowchart of an example of retraction control of the first embodiment.

Now, the retraction control of the magnetic disk device 1 will be explained. FIG. 3 is a flowchart of an example of the retraction control.

Initially, whether or not the power supplied to the magnetic disk device 1 is cut is determined (ST101), and if the power cut is recognized (YES in ST101), a back electromotive force of the SPM 3 is generated and the back electromotive force is rectified by the back electromotive force rectifier circuit 21 (ST102). The rectified current is supplied to the internal logic circuit 22 in the driver IC 20 and the regulator. Furthermore, the current can be supplied to the actuator drivers 23A and 23B at a time during steps ST103 to ST106, which will be explained below.

Now, the back electromotive force rectifier circuit 21 supplies retraction current to the actuator driver 23A (ST103). Thus, the actuator 4A is retracted. That is, when the actuator 4A positioned in a certain position over the disk 2A is moved in the outer periphery direction of the disk 2A and reaches the outer periphery part, a latching process by the magnet latch mechanism 30 is performed. Note that, when the retraction current is supplied to the actuator driver 23A, the retraction current is not supplied to the actuator driver 23B.

Then, whether or not the retraction of the actuator 4A is completed is determined (ST104). If the completion of the retraction of the actuator 4A is not recognized (NO in ST104), the process returns to step ST103. Thus, the retraction process of the actuator 4A continues.

If the retraction of the actuator 4A is completed (YES in ST104), the back electromotive force rectifier circuit 21 supplies the retraction current to the actuator driver 23B (ST105). Thus, the actuator 4B is retracted. That is, when the actuator 4B positioned in a certain position over the disk 2B is moved in the outer periphery direction of the disk 2B and reaches the outer periphery part, a latching process by the magnet latch mechanism 30 is performed. Note that, when the retraction current is supplied to the actuator driver 23B, the retraction current is not supplied to the actuator driver 23A.

Then, whether or not the retraction of the actuator 4B is completed is determined (ST106). If the completion of the retraction of the actuator 4B is not recognized (NO in ST106), the process returns to step ST105. Thus, the retraction process of the actuator 4B continues.

If the retraction of the actuator 4B is completed (YES in ST106), data transfer from the DRAM 27 to the FROM 28 is performed (ST107). At that time, a 1.8 V power is supplied from the regulator 24 to the DRAM 27 and the FROM 28, and thus, the DRAM 27 and the FROM 28 are operable. The data transfer process from the DRAM 27 to the FROM 28 is performed under control of the Soc 25.

Then, whether or not the data transfer is completed is determined (ST108). If the completion of the data transfer is not recognized (NO in ST108), the process returns to step ST107, and the data transfer from the DRAM 27 to the FROM 28 is continued. If the completion of the data transfer is recognized (YES in ST108), the process ends. Therefore, the data stored in the DRAM 27 are stored in the FROM 28.

Thus, if the data in the DRAM 27 are erased because the power is cut and the power supplied from the regulator 24 to the DRAM 27 is stopped, the data can be maintained in the FROM 28. Thus, when the magnetic disk device 1 is turned on after the shutdown, the data stored in the DRAM 27 before the shutdown can be read from the FROM 28. Note that, when the actuators 4A and 4B are retracted sequentially, a time required to complete the retraction becomes longer as compared to a case of single actuator structure. However, the time for retraction is sufficiently short with respect to the time of decreasing of the back electromotive force of SPM 3 (for example, 10% or less). Thus, the sequential retraction of the actuators 4A and 4B does not substantially affect the data transfer from the DRAM 27 to the FROM 28.

Figure 4:
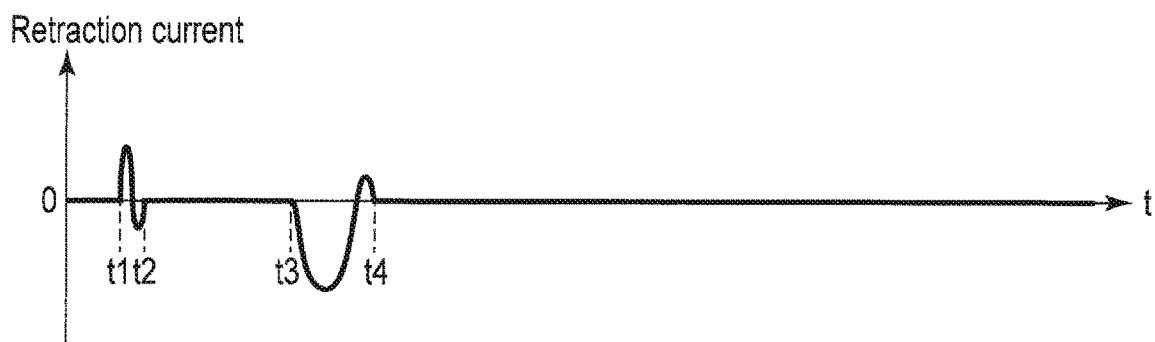
FIG. 4 shows an example of a relationship between current supplied to a first actuator of the first embodiment and a time.
Figure 5:
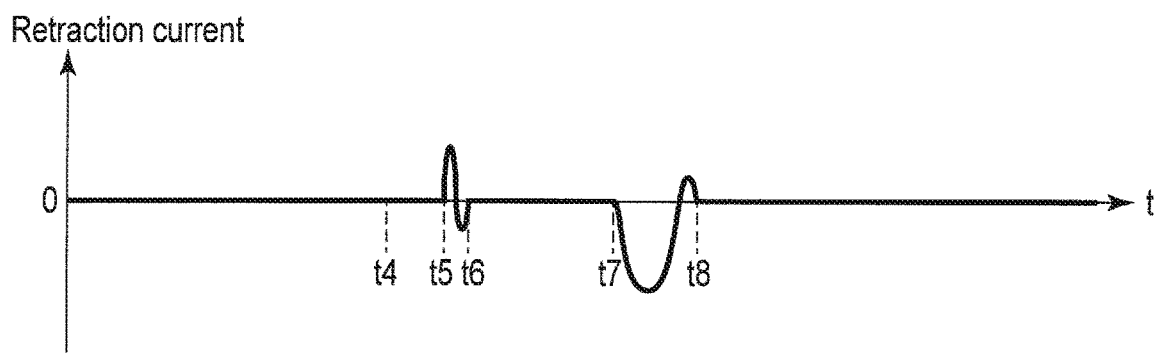
FIG. 5 shows an example of a relationship between current supplied to a second actuator of the first embodiment and a time.
Figure 6:
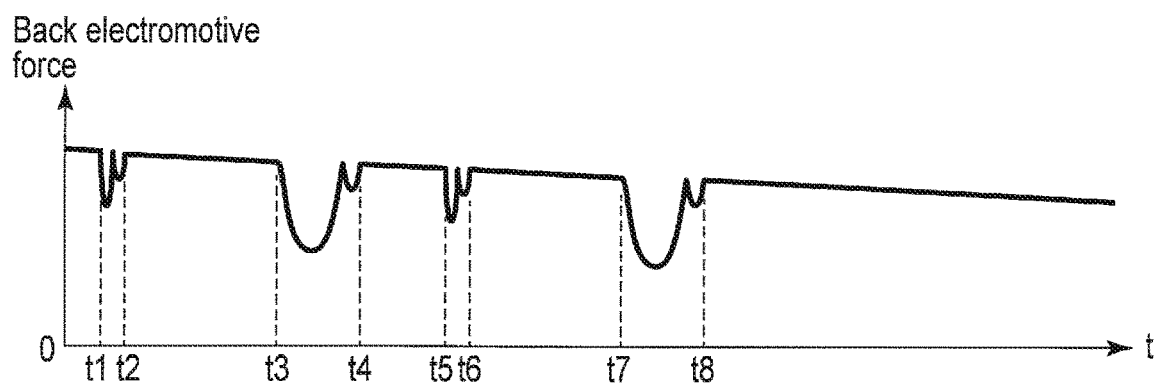
FIG. 6 shows an example of a relationship between a back electromotive force of the first embodiment and a time.

Now, the operation of the magnetic disk device 1 when the power is cut will be explained with reference to FIGS. 4 to 6. FIG. 4 shows an example of a relationship between current supplied to the actuator 4A of the present embodiment and a time. FIG. 5 shows an example of a relationship between current supplied to the actuator 4B of the present embodiment and a time. FIG. 6 shows an example of a relationship between the back electromotive force of the present embodiment and a time. Note that, in each of FIGS. 4 to 6, the horizontal axis is time t. In each of FIGS. 4 and 5, the vertical axis is retraction current, and in FIG. 6, the vertical axis is back electromotive force.

When the power is cut, as shown in FIG. 4, brake current to stop the operation of the actuator 4A is supplied (between time t1 and time t2). Then, the back electromotive force is lowered in proportion with the brake current because of the coil resistance of the SPM 3. Then, the actuator 4A is driven and is moved to the outer periphery part of the disk 2A at a constant speed (between time t2 and time t3), and a great force is generated in a ramp direction by the magnet latch mechanism 30. The retraction current is supplied to cancel the force (between time t3 and time t4). The retraction current at that time is used to slow down the speed of one actuator 4A colliding the magnet latch mechanism 30 (outer stop), and the back electromotive force is not decreased excessively. That is, the operation of the internal logic circuit 22 is not affected, and the retraction current is not limited. Therefore, when the actuator 4A is retracted, the actuator 4A can be latched to the magnet latch mechanism 30 without accelerating the speed of collision to the outer stop. Note that time t1 corresponds to a first time of the claims.

Then, after the retraction of the actuator 4A is completed, as shown FIG. 5, brake current to stop the operation of the actuator 4B is supplied (between time t5 and time t6). Then, the back electromotive force is lowered in proportion with the brake current because of the coil resistance of the SPM 3. Then, the actuator 4B is driven and is moved to the outer periphery part of the disk 2B at a constant speed (between time t6 and time t7), a great force is generated in a ramp direction by the magnet latch mechanism 30. The retraction current is supplied to cancel the force (between time t7 and time t8). The retraction current at that time is used to low down the speed of one actuator 4B colliding the magnet latch mechanism 30 (outer stop), and the back electromotive force is not decreased excessively. That is, as in the actuator 4A, the operation of the internal logic circuit 22 is not affected, and the retraction current is not limited. Therefore, when the actuator 4B can be latched to the magnet latch mechanism 30 without accelerating the speed of collision to the outer stop. Note that time t5 corresponds to a second time of the claims.

When the actuators 4A and 4B are retracted, the back electromotive force decreases in the following four cases, that is, when the brake current is supplied to the actuator 4A (between time t1 and time t2), when the retraction current is supplied (between time t3 and time t4), when the brake current is supplied to the actuator 4B (between time t5 and time t6), and when the retraction current is supplied (between time t7 and time t8). However, as shown in FIG. 6, the above four times are shifted from each other, and thus, excessive decrease of the back electromotive force does not occur in the retraction of the dual-actuators 4A and 4B. Thus, the colliding speed of the actuators 4A and 4B to the magnet latch mechanism 30 (outer stop) is not so fast, contaminants are suppressed, and deterioration of the reliability of the magnetic disk device 1 can be prevented. Therefore, the magnetic disk device 1 with two actuators 4A and 4B can safely perform the retraction control and the reliability can be improved.

Note that, in the present embodiment, the dual actuator system includes vertically arranged two actuators 4A and 4B, and thus, a magnet latching force of the magnet latch mechanism 30 is small as compared to the single actuator system, and thus, the force generated in the ramp direction becomes small. However, the torque constant of each actuator 4A and 4B becomes small, and thus, the retraction current required is substantially the same as that used in the magnetic disk device with the single actuator system. Thus, in the magnetic disk device 1 of the present embodiment, retractions of two actuators 4A and 4B needs to be performed at different times.

Second Embodiment

FIG. 7 shows a schematic example of a magnetic disk device 1A of a second embodiment. Unlike the magnetic disk device 1 of the first embodiment, the magnetic disk device 1A includes two driver ICs. Thus, in the following description, elements different from those of the first embodiment will be explained, and the elements similar to those of the first embodiment will be referred to by the same reference numbers and the detailed description thereof will be omitted.

As shown in FIG. 7, the magnetic disk device 1A includes driver ICs 20A and 20B. The driver IC 20A has the same structure as the driver IC 20 (cf. FIG. 1) except for the actuator driver 23B omitted. Note that a back electromotive force rectifier circuit 21A, internal logic circuit 22A, and regulator 24A functionally correspond to the back electromotive force rectifier circuit 21, internal logic circuit 22, and regulator 24, respectively.

Furthermore, the driver IC 20B includes a back electromotive force rectifier circuit 21B, internal logic circuit 22B, actuator driver 23B, and regulator 24B. Note that the back electromotive force rectifier circuit 21B, internal logic circuit 22B, and regulator 24B functionally correspond to the back electromotive force rectifier circuit 21, internal logic circuit 22, and regulator 24, respectively.

Furthermore, the driver IC 20A and the driver IC 20B are connected via line L1. When the retraction of the actuator 4A by the actuator driver 23A ends, the driver IC 20A sends a signal indicative of the completion of the retraction of the actuator 4A to the driver IC 20B via line L1. The driver IC 20B starts retraction of the actuator 4B at the time when the signal is received.

With the above structure, the advantages obtained in the first embodiment can be similarly achieved. Furthermore, with two driver ICs 20A and 20B, development costs of the driver IC can be suppressed as compared to a case where one driver IC 20 is used.

Note that, in the second embodiment, a signal indicative of completion of retraction is directly sent to the driver IC 20B from the driver IC 20A via line L1; however, this is merely an example. For example, the driver ICs 20A and 20B may be each connected to the Soc 25 and the following process may be performed. Initially, the Soc 25 sends a signal to start retraction of the actuator 4A to the driver IC 20A. Then, the Soc 25 receives a signal indicative of completion of the retraction from the driver IC 20A. Then, the Soc 25 sends a signal to start retraction of the actuator 4B to the driver IC 20B, and the Soc 25 receives a signal indicative of completion of the retraction from the driver IC 20B. Through the above process, the advantages obtained in the second embodiment can be similarly achieved. In a case where the above process is performed by the Soc 25, program (firmware) to perform the process is stored in the Soc 25. Furthermore, a structure to connect the driver ICs 20A and 20B via line L1 can be omitted.

Note that, in the above embodiments, the magnetic disk device 1 includes dual actuators as an example of a plurality of actuators system; however, this is merely an example. The techniques of the above embodiments can be applied to a magnetic disk device including three or more actuators driven independently.

Furthermore, in the above embodiments, when the power is cut, the magnetic disk devices 1 and 1A perform the retraction of the actuators 4A and 4B; however, this is merely an example. For example, the techniques of the above embodiments can be adopted similarly in a case where an external impact is applied to the magnetic disk device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a first magnetic disk;
   a second magnetic disk;
   a first actuator with a first head which reads/writes data from/to the first magnetic disk;
   a second actuator with a second head which reads/writes data from/to the second magnetic disk, the second actuator operated independently from the first actuator;
   a first controller configured to retract the first actuator at a first time; and
   a second controller configured to retract the second actuator at a second time which is shifted from the first time by a certain period of time, wherein
   the certain period of time is a period of time when the retraction of the first actuator from the first magnetic disk is completed.

2. The magnetic disk device of claim 1, wherein the first controller and the second controller retract the first actuator and the second actuator respectively when the power is shut down.

3. The magnetic disk device of claim 1, further comprising:
   a volatile memory;
   a nonvolatile memory; and
   a third controller configured to manage data stored in the volatile memory and the nonvolatile memory, wherein
   the third controller transfers the data stored in the volatile memory to the nonvolatile memory after the completion of retraction of the second actuator.

4. The magnetic disk device of claim 2, further comprising:
   a spindle motor configured to operate the first actuator and the second actuator, wherein, upon detection of the shutdown of the power, the first controller retracts the first actuator based on a back electromotive force of the spindle motor, and the second controller retracts the second actuator based on the back electromotive force of the spindle motor.

5. The magnetic disk device of claim 4, further comprising:
   a rectifier circuit which rectifies the back electromotive force of the spindle motor, wherein current rectified by the rectifier circuit is supplied to the first controller and the second controller.

6. The magnetic disk device of claim 1, wherein the first controller and the second controller are included in one control unit.

7. The magnetic disk device of claim 1, wherein the first controller and the second controller are different controllers.

8. The magnetic disk device of claim 7, wherein
   the first controller and the second controller are connected,
   the first controller transmits a signal indicative of completion of the retraction of the first actuator to the second controller, and
   the second time when the second controller starts the retraction of the second actuator is a time when the second controller receives the signal from the first controller.

9. A magnetic disk device, comprising:
   a first magnetic disk;
   a second magnetic disk;
   a first actuator with a first head which reads/writes data from/to the first magnetic disk;
   a second actuator with a second head which reads/writes data from/to the second magnetic disk, the second actuator operated independently from the first actuator;

a first controller configured to retract the first actuator at a first time;
a second controller configured to retract the second actuator at a second time which is shifted from the first time by a certain period of time; and
a spindle motor configured to operate the first actuator and the second actuator, wherein
the first controller and the second controller retract the first actuator and the second actuator respectively when the power is shut down, and upon detection of the shutdown of the power, the first controller retracts the first actuator based on a back electromotive force of the spindle motor, and the second controller retracts the second actuator based on the back electromotive force of the spindle motor.

10. A magnetic disk device, comprising:
a first magnetic disk;
a second magnetic disk;
a first actuator with a first head which reads/writes data from/to the first magnetic disk;
a second actuator with a second head which reads/writes data from/to the second magnetic disk, the second actuator operated independently from the first actuator;
a first controller configured to retract the first actuator at a first time; and
a second controller configured to retract the second actuator at a second time which is shifted from the first time by a certain period of time, wherein
the first controller and the second controller are different controllers, and the first controller and the second controller are connected,
the first controller transmits a signal indicative of completion of the retraction of the first actuator to the second controller, and
the second time when the second controller starts the retraction of the second actuator is a time when the second controller receives the signal from the first controller.

* * * * *